E. W. Sargent,
Mechanical Movement.
N° 79,013.  Patented June 16, 1868.
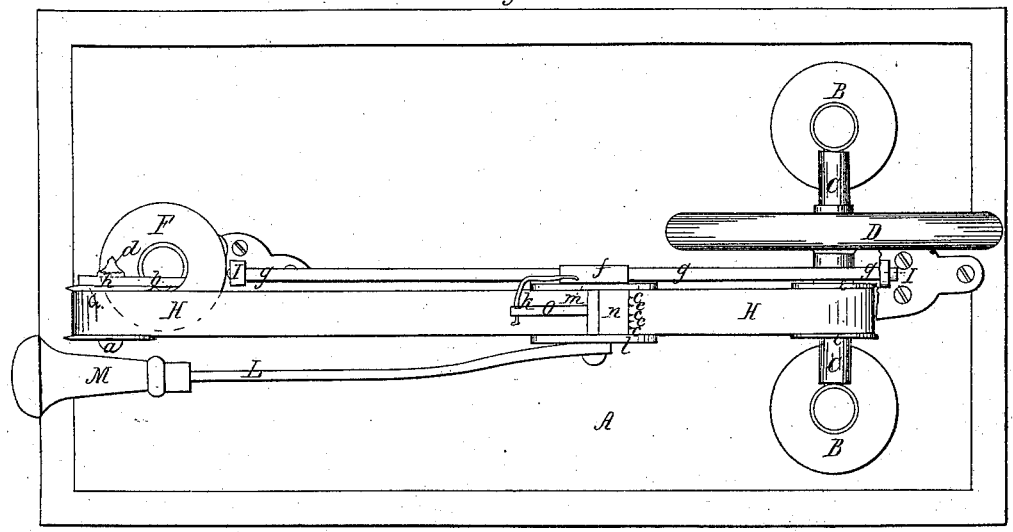
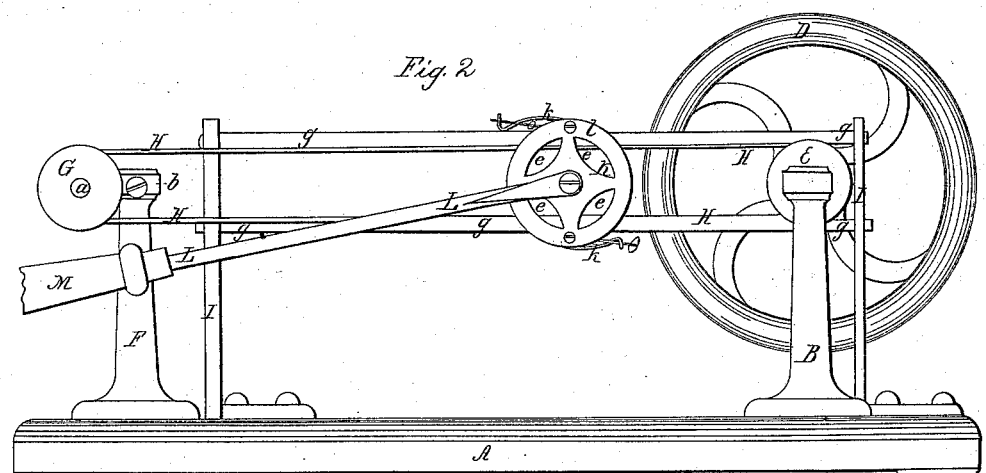
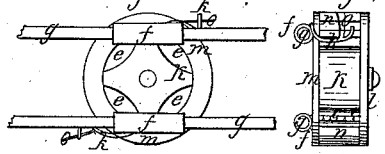
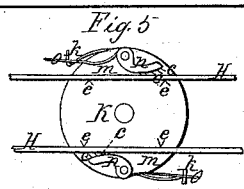
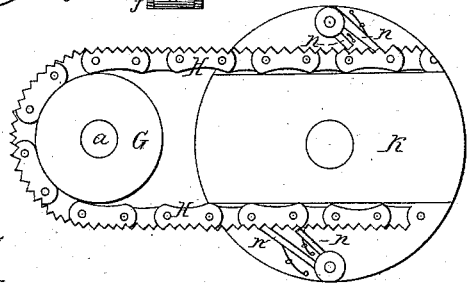
Witnesses  
Inventor  
Ethenan W. Sargent

United States Patent Office.

ELHANAN W. SARGENT, OF LOWELL, MASSACHUSETTS.

*Letters Patent No. 79,013, dated June 16, 1868.*

---

IMPROVED MECHANICAL MOVEMENT.

---

*The Schedule referred to in these Letters Patent and making part of the same.*

---

TO ALL WHOM IT MAY CONCERN:

Be it known that I, ELHANAN W. SARGENT, of Lowell, in the county of Middlesex, and State of Massachusetts, have invented a new and improved Mechanical Movement or device for converting reciprocating rectilinear motion into continuous rotary motion, of which the following is a full, clear, and exact description, that will enable those skilled in mechanic arts to make and use my invention, reference being had to the accompanying drawings, making part of this specification, in which—

Figure 1 is a plan or top view.

Figure 2, a side elevation.

Figure 3, the opposite side of the cross-head, and a portion of each of the guide-rods $g$.

Figure 4, an end elevation of fig. 3.

Figure 5, a side view of the cross-head, after the plate $l$ has been removed, showing portions of the belt or band H, the pivoted nippers and points, and the springs which actuate the nippers, to keep the points in proper contact with the belt when the device is set in motion.

Figure 6 is a modification of my device, showing in what manner a ratchet-chain and pawls may be employed instead of the belt or band and the nippers, shown in the other figures.

The object of this invention is to provide a simple, cheap, and very efficient apparatus for converting reciprocating motion into continuous rotary motion; to overcome the difficulties attending the use of a crank; to avoid friction, and consequently wear, in the moving or operating parts; and to gain power by economical expenditure of force.

In constructing my improved apparatus, I first provide a suitable bed-plate, A, to the upper side, and near one end of which, I apply two vertical stands B. In the top ends of these stands are bearings, which receive the ends of a horizontal transverse shaft, C. A balance-wheel, D, is arranged on and near one end of this shaft, and near the other end is a pulley, E.

Near the opposite end of the bed-plate A, and to the upper side thereof, I apply a vertical stand, F, and near the top end of this stand a pulley, G, is arranged on a stud, $a$, projecting from one side of a supporting-arm, $b$, secured to the top of the stand F. This last-named pulley is opposite the pulley E on the shaft C, and an endless belt or band, H, extends from one pulley to the other, and around both of said pulleys.

The arm $b$ is adjustable by means of a nut, $d$, on the end of the stud $a$, and by a slot in the portion $h$ of the arm, and the belt H may be slackened or tightened by releasing the nut $d$ and moving the stud $a$ and the pulley G.

A little inside of the stand F, and beyond the shaft C, are stands I, the lower ends of which are secured to the bed-plate A, and the upper ends extend above the tops of the stands B and F. Near the top ends of the stands I, and extending from one to the other, is a horizontal guide-rod, $g$, and a short distance below is another guide-rod, like the first. Both of these guide-rods are secured to the stands I in a suitable manner.

A cross-head, K, is arranged to slide upon the guide-rods $g$ in sleeve-bearings $f$, secured to the back plate $m$ of the cross-head, and the central portion, $e$, fills the space between the two parts of the belt. Above and below the central portion, $e$, outside of the belt, nippers $n$ are pivoted to and between the plates $m$ and $l$ of the cross-head. These nippers are armed with needle-points $c$, which engage with or penetrate the substance of the belt when the cross-head is moved in either direction, and springs O, secured to the heads of the nippers, and projecting outward, come in contact with bent wires or rods $k$, to hold the points $c$ in contact with the surfaces of the belt, each nipper acting in an opposite direction when the cross-head is reciprocated, the upper nipper engaging with the upper portion of the belt when the cross-head is moved in one direction, and the lower nipper performing the same operation on the lower portion of the belt when the cross-head is moved in the opposite direction, thus keeping the belt H and the shaft C and wheel D constantly in motion, and converting reciprocating motion into continuous rotary motion; or, in other words, imparting continuous rotary motion to the shaft C and the wheel D by the reciprocating motion of the cross-head and the action of the nippers on two parts or portions of the belt.

The connecting-rod L may have a handle, M, to operate the device; or said connecting-rod may be longer, and form the connecting-rod of the cylinder of a steam-engine; or it may connect with a treadle or foot-lever, as employed on sewing-machines, foot-lathes, or other light operating machines, requiring but little power to drive them.

When my improved device is operated by a steam-engine, or where a great amount of power is required, I prefer a ratchet-chain, H, and pawls n, as shown in fig. 6, instead of the belt or band, and the nippers with needle-points, hereinbefore described, the mode of operation in one being the same as in the other, and either may be used without departing from the principle of the invention or changing the mode of operation.

My device may be operated with a short stroke, and only a slight movement of the cross-head, or with a long stroke, and a more extended motion or reciprocation of the cross-head, according to the amount of power or motion required to drive the machine, or the number of machines connected.

When only one machine is driven by my device, the shaft C may be the main shaft, or the driving-shaft of such machine; and when more than one machine is to be driven by said device, a pulley may be arranged on the shaft C, from which to run a belt to some other shaft, having several pulleys, to drive machinery in the usual way.

Having fully described my invention, what I claim as new, and desire to secure by Letters Patent, is—

1. The cross-head K, constructed as described, and provided with nippers n, and combined with the guide-rods g and belt H, in the manner and for the purpose substantially as described.

2. The combination of all the operative parts specified, arranged to operate substantially as and for the purpose set forth.

ELHANAN W. SARGENT.

Witnesses:
    J. S. WHITNEY,
    JOHN E. CRANE.